United States Patent
Prakash et al.

(10) Patent No.: US 11,954,503 B2
(45) Date of Patent: Apr. 9, 2024

(54) SYSTEM AND METHOD FOR BUILDING KNOWLEDGEBASE OF DEPENDENCIES BETWEEN CONFIGURATION ITEMS

(71) Applicant: Cognizant Technology Solutions India Pvt. Ltd., Chennai (IN)

(72) Inventors: Rohit Prakash, Bangalore (IN); Rohan Prakash, Bangalore (IN); Yogesh Sosale Gundurao, Bangalore (IN); Ambarish Poojari, Bantwala (IN); Ragini Suresh, Bangalore (IN); Pooja Jagadish, Bangalore (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 78 days.

(21) Appl. No.: 17/742,542

(22) Filed: May 12, 2022

(65) Prior Publication Data

US 2023/0259368 A1 Aug. 17, 2023

(30) Foreign Application Priority Data

Feb. 14, 2022 (IN) .............................. 202241007772

(51) Int. Cl.
*G06F 9/44* (2018.01)
*G06F 9/38* (2018.01)
*G06F 9/445* (2018.01)
(52) U.S. Cl.
CPC ........ *G06F 9/44505* (2013.01); *G06F 9/3838* (2013.01)

(58) Field of Classification Search
CPC ................. G06F 1/32; G06F 9/44; G06F 1/28
See application file for complete search history.

(56) References Cited

U.S. PATENT DOCUMENTS 7,900,201 B1 3/2011 Qureshi
8,161,325 B2 4/2012 Calman
(Continued)

OTHER PUBLICATIONS

Building a closed loop automation system for real-world telco network workloads, URL: https://developer.IBM.com/ articles/ building-a-closed-loop-automation-system/, Aug. 19, 2021.
(Continued)

*Primary Examiner* — Keshab R Pandey
(74) *Attorney, Agent, or Firm* — CANTOR COLBURN LLP

(57) ABSTRACT

The present invention provides for building a knowledgebase of dependencies between Configuration Items(CIs) associated with IT computing environment. In operation, the present invention provides for mapping a plurality of Configuration Items(CI) with respective one or more actions. The present invention further provides for tracking and capturing of one or more actions performed on one or more CIs in relation to resolving an activity related to a reported CI. Further, the present invention provides for identifying dependencies between one or more CIs and the reported CI based on the captured one or more actions. Furthermore, the present invention provides for building a knowledgebase of dependencies between CIs of the computing environment based on the identified dependencies between one or more CIs and the reported CI. Yet further, the present invention provides for generating visual representations of dependencies between CIs.

25 Claims, 4 Drawing Sheets

(56) References Cited

U.S. PATENT DOCUMENTS

| | | |
|---|---|---|
| 8,368,640 B2 | 2/2013 | Dardinski |
| 11,163,633 B2 | 11/2021 | Bangad |
| 11,176,464 B1 | 11/2021 | Sagi |
| 11,651,032 B2 * | 5/2023 | Jayaraman .............. G06F 40/30 |
| | | 706/12 |
| 2017/0228403 A1 * | 8/2017 | Kumar .................... G06F 16/23 |

OTHER PUBLICATIONS

Configuration item topology—IBM Documentation; https://www.ibm.com/docs/en/cdfsp/7.6.1.2?topic=SSANHD_7.6.1.2/com.IBM.sccd.doc/config/c_config_ci_topo.html, Feb. 21, 2022.

Creating relationships between configuration items, URL: https://docs.bmc.com/docs/remedyforce/201501/creating-relationships-between-configuration-items-505924449.html; Jan. 15, 2020.

\* cited by examiner

SYSTEM AND METHOD FOR BUILDING KNOWLEDGEBASE OF DEPENDENCIES BETWEEN CONFIGURATION ITEMS

CROSS REFERENCE TO RELATED APPLICATION

This application is related to and claims the benefit of Indian Patent Application Number 202241007772 filed on Feb. 14, 2022, the contents of which are herein incorporated by reference in their entirety.

FIELD OF THE INVENTION

The present invention relates generally to the field of Information Technology (IT). More particularly, the present invention relates to a system and a method for building a knowledgebase of dependencies between various configuration items in an IT computing environment, whereby conflicts or issues in the IT computing environment may be efficiently resolved.

BACKGROUND OF THE INVENTION

A typical IT computing environment is representative of a group of interconnected resources that can work as a unit to perform one or more functions. An example of IT computing environment may be a datacenter comprising resources, such as one or more servers, the one or more servers further comprising one or more hard disks for hosting one or more instances of an application. Further, the one or more servers may be interconnected via network devices, such as routers, switches, modems, repeaters etc. Each of the resources including the servers, the hard disks, the network devices, the application, the sub-components of the resources, for examples memory of hard disks, and software configurations of each of the resources are referred to as Configuration Items(CIs). In another example, an IT computing environment may comprise a group of virtual workstations connected over a Virtual Private Network (VPN) with access to shared resources, such as memory, printers, processors etc. In the exemplified environment, each resource enabling setup of the virtual workstations, such as network devices, software components, VPN tokens, processors, memory etc. are the Configuration Items(CIs).

As understandable from the above examples, each Configuration Item(CI) is dependent on one or more Configuration Items(CIs), and together enable smooth execution of the one or more functions implemented by the IT computing environment. However, due to dependencies between the one or more configuration items, an issue in one configuration item often cascades issues on to other configuration items associated directly or indirectly with the faulty configuration item. Often issues, such as application not working, server not working, system bugs, data unavailability, resource unavailability etc. are detected in the IT computing environment or reported by a client via an IT support ticket. Thereafter, a root cause analysis of the issue is performed by a service engineer manually and/or via software tools to identify the source of issue, in particular the primary configuration item causing the issue.

At present, performing root cause analysis typically requires analyzing large volumes of data, such as log events, configuration files, and navigating through various configuration items based on infrastructure knowledge of the computing environment to identify the source of issue. This is usually due to the lack of knowledge regarding the dependencies or relationships between various configuration items in the IT computing environment. For Example, if a certain server goes down, a health check on the server is ideally a first action that is performed to resolve the issue. However, often the failure of a specific configuration item is caused by other configuration items associated with the failed configuration item. For instance, the server may be using a database system, and a storage issue in the database may be cascading to the server, further leading to downtime of the server. However, in the absence of knowledge regarding the dependencies or relationships between the configuration items, such as the server, the database and the storage, a time intensive root cause analysis is often performed by examining various configuration items by a service engineer as per his expertise to identify the configuration item which is the source of issue. Some of these analysis can last hours, or even days, in the case of an unfamiliar or complex issue, further affecting Service-Level Agreement (SLA's), Key Result Objective(KRO) and Key Performance indicators (KPI) of the computing environment.

In light of the aforementioned drawbacks, there is a need for a system and a method that can build knowledgebase of dependencies between Configuration Items(CIs) associated with a computing environment. Further, there is a need for a system and a method that can dynamically identify relationships between various configuration items.

Furthermore, there is a need for a system and a method that can automatically generate visual representations of dependencies between one or more CIs for enabling effective and speedy resolutions to an issue in the computing environment. Yet further, there is a need for a system and a method that minimizes errors during troubleshooting of an issue by providing precise dependencies between various configuration items. Yet further, there is a need for a system and a method which minimizes manual intervention for identifying and resolving issues associated with the CIs. Yet further, there is a need for a system and a method that reduces turnaround time in resolving a CI related issue in the computing environment, thereby enhancing the operational metrics of the computing environment. Yet further, there is a need for a system and a method which is economical and can be easily integrated with any existing computing environment.

SUMMARY OF THE INVENTION

In accordance with various embodiments of the present invention, a method for building a knowledgebase of dependencies between a plurality of Configuration Items(CIs) of an IT computing environment is provided. The method is implemented by a processor executing program instructions stored in a memory. The method comprises mapping each of the plurality of Configuration Items(CIs) of the IT computing environment with respective one or more actions. The method further comprises tracking and capturing one or more actions out of the mapped actions performed on one or more CIs and/or a reported CI out of the plurality of CIs in relation to resolving an activity associated with the reported CI. Further, the method comprises identifying dependency between the reported CI and the one or more CIs based on the captured one or more actions using data analysis. Yet further, the method comprises forming dependency topology between the reported CI and the one or more CIs based on the identified dependency between said reported CI and said one or more CIs. Yet further, the method comprises repeating the step of tracking and capturing, identifying dependency, and forming dependency topology between each reported CI and one or more CIs for every distinct activity associated with each reported CI out of the plurality of CIs. Yet further, the method comprises building the knowledgebase of dependencies between the plurality of CIs based on each of the formed dependency topologies between each of the reported CIs and the one or more CIs.

In accordance with various embodiments of the present invention, a system for building a knowledgebase of dependencies between a plurality of Configuration Items(CIs) of an IT computing environment is provided. The system comprises a memory storing program instructions, a processor configured to execute program instructions stored in the memory, and a knowledgebase building engine executed by the processor. The system configured to map each of the plurality of Configuration Items(CIs) of the IT computing environment with respective one or more actions. Further, the system is configured to track and capture one or more actions out of the mapped actions performed on one or more CIs and/or a reported CI out of the plurality of CIs in relation to resolving an activity associated with the reported CI. Furthermore, the system is configured to identify dependency between the reported CI and the one or more CIs based on the captured one or more actions using data analysis. Yet further, the system is configured to form dependency topology between the reported CI and the one or more CIs based on the identified dependency between said reported CI and said one or more CIs. Yet further, the system is configured to repeat the step of tracking and capturing, identifying dependency, and forming dependency topology between each reported CI and one or more CIs for every distinct activity associated with each reported CI out of the plurality of CIs. Yet further, the system is configured to build the knowledgebase of dependencies between the plurality of CIs based on each of the formed dependency topologies between each of the reported CIs and the one or more CIs.

In accordance with various embodiments of the present invention, a computer program product is provided. The computer program product comprises a non-transitory computer-readable medium having computer-readable program code stored thereon, the computer-readable program code comprising instructions that, when executed by a processor, cause the processor to map each of the plurality of Configuration Items(CIs) of the IT computing environment with respective one or more actions. Further, one or more actions out of the mapped actions performed on one or more CIs and/or a reported CI out of the plurality of CIs in relation to resolving an activity associated with the reported CI are tracked and captured. Furthermore, dependency between the reported CI and the one or more CIs is identified based on the captured one or more actions using data analysis. Yet further, dependency topology between the reported CI and the one or more CIs is formed based on the identified dependency between said reported CI and said one or more CIs. Yet further, tracking and capturing, identifying dependency, and forming dependency topology between each reported CI and one or more CIs for every distinct activity associated with each reported CI out of the plurality of CIs are repeated. Yet further, the knowledgebase of dependencies between the plurality of CIs is built based on each of the formed dependency topologies between each of the reported CIs and the one or more CIs.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

Figure 1:
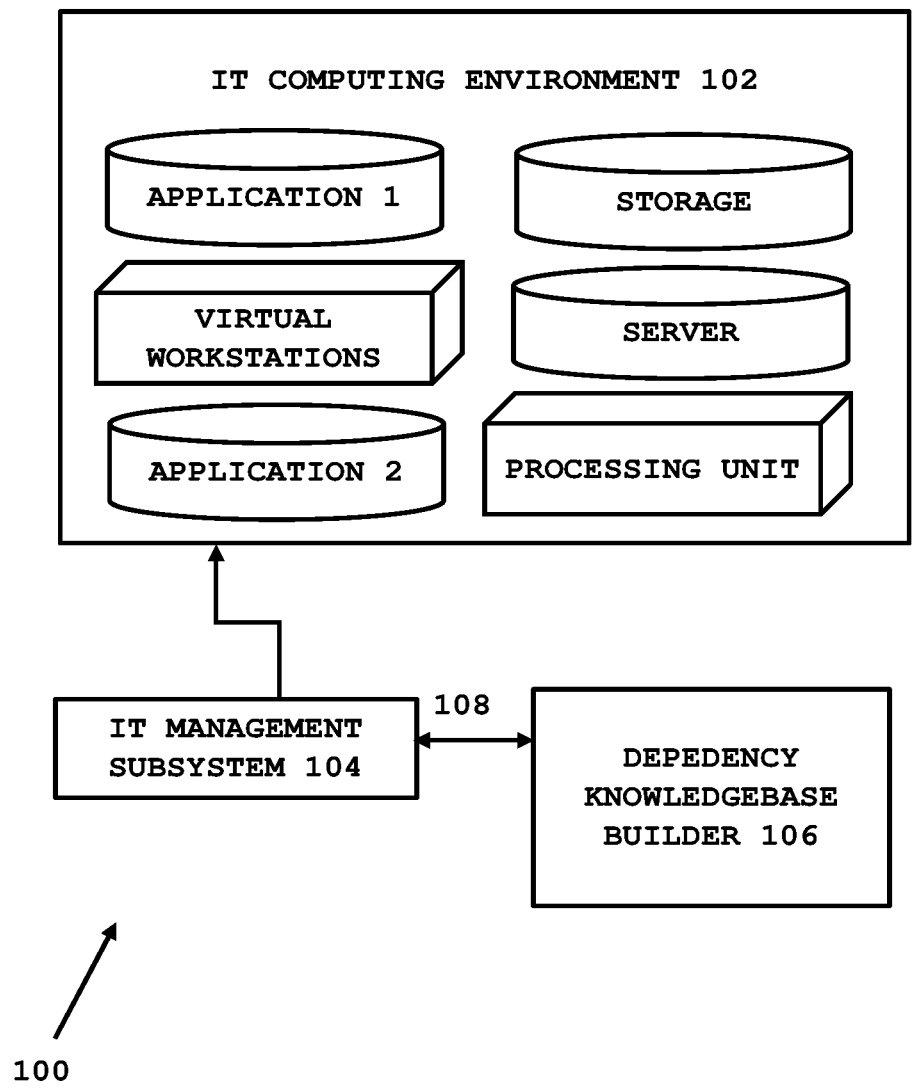
FIG. 1 is a block diagram of an environment including a system for building a knowledgebase of dependencies between Configuration Items(CIs) associated with a computing environment, in accordance with an embodiment of the present invention.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention. The term "computing environment" as used in the specification refers to a group of interconnected hardware and/or software components in an IT ecosystem that can work as a unit to perform one or more desired functions. The terms "computing environment" and "IT computing environment" have been used interchangeably. The term "Configuration Item(CI)" as used in the specification refers to components of the computing environment, such as an application software, network components, an operating system, a firmware, central processing units, servers, databases or any other hardware and/or software component.

The present invention discloses a system and a method for building a knowledgebase of dependencies between Configuration Items(CIs) associated with a computing environment. In particular, the present invention, discloses a system and a method that dynamically identifies dependencies between various configuration items based on real-time tracking of activities associated with the corresponding configuration items and builds a knowledgebase of the identified dependencies. In operation, the present invention provides for mapping a plurality of Configuration Items(CI) of a computing environment with actions related to one or more activities associated with respective CIs. The present invention further provides for real-time tracking and capturing of one or more mapped actions performed on one or more CIs to execute a task activity or troubleshoot an issue activity related to a reported CI. Further, the present invention provides for dynamically identifying dependencies or relationships between one or more CIs and the reported CI based on the captured one or more actions performed on the one or more CIs. Furthermore, the present invention provides for building a knowledgebase of dependencies between CIs in the computing environment based on the identified dependencies between one or more CIs and the reported CI. Yet further, the present invention provides for generating visual representations of dependencies between CIs based on the knowledgebase. The visual representations are configured to illustrate respective CIs and associated one or more dependent CIs. Yet further, the present invention, provides for visually representing issues in the computing environment by highlighting in real-time visual representations of dependencies between the CIs.

The present invention would now be discussed in context of embodiments as illustrated in the accompanying drawings.

Referring to FIG. 1, a block diagram of an environment including a system for building a knowledgebase of dependencies between Configuration Items(CIs) associated with a computing environment is illustrated. In an embodiment of the present invention the environment 100 includes an Information Technology(IT) computing environment 102, an IT management subsystem 104 and a system for building a knowledgebase of dependencies between Configuration Items(CIs) associated with a computing environment, hereinafter referred to as a dependency knowledgebase builder 106.

In accordance with various embodiments of the present invention, the IT computing environment 102 is a group of interconnected hardware and/or software components, hereinafter referred to as Configuration Items (CIs) that can work as a unit to perform one or more desired functions. In an embodiment of the present invention, the IT computing environment 102 comprises a plurality of hardware and/or software CIs, such as but not limited to, servers, network devices, storage, printers, workstations, applications etc. In an embodiment of the present invention, the IT computing environment 102 is developed by an IT service provider and deployed remotely and/or locally for an organization. In another embodiment of the present invention, the IT computing environment 102 may be implemented using a client-server architecture, wherein a client-computing device (not shown) accesses various resources, such as processing units, applications, storage, servers etc. provided by the IT computing environment 102 over a communication channel (not shown). Examples of the communication channel may include, but are not limited to, an interface such as a software interface, a physical transmission medium such as a wire, or a logical connection over a multiplexed medium such as a radio channel in telecommunications and computer networking. Examples of radio channel in telecommunications and computer networking may include, but are not limited to, a Local Area Network (LAN), a Metropolitan Area Network (MAN), and a Wide Area Network (WAN).

In another embodiment of the present invention, the IT computing environment 102 may be implemented in a cloud computing architecture in which data, applications, services, and other resources are stored and delivered through shared data-centers. In an exemplary embodiment of the present invention, the IT computing environment 102 is a remote resource implemented over the cloud and accessible for shared usage in a distributed computing architecture by one or more client-computing devices (not shown). In accordance with various embodiments of the present invention, the client-computing device may be a general purpose computer, such as a desktop, a laptop, a smartphone and a tablet; a super computer; a microcomputer or any device capable of executing instructions, connecting to a network and sending/receiving data.

In accordance with various embodiments of the present invention, the IT management subsystem 104 may be any tool configured to manage various CIs of the computing environment 102. In accordance with various embodiments of the present invention, the IT management subsystem 104 may be a hardware or a software or a combination of hardware and a software. In an embodiment of the present invention, the IT management subsystem 104 interfaces with the IT computing environment 102 over a communication channel(not shown). Examples of the communication channel may include, but are not limited to, an interface such as a software interface, a physical transmission medium such as a wire, or a logical connection over a multiplexed medium such as a radio channel in telecommunications and computer networking. Examples of radio channel in telecommunications and computer networking may include, but are not limited to, a Local Area Network (LAN), a Metropolitan Area Network (MAN), and a Wide Area Network (WAN). In an embodiment of the present invention, the IT management subsystem 104 is configured to receive support requests indicative of issues in the computing environment 102 from client-computing devices using resources of the computing environment 102. Further, the IT management subsystem 104 may be configured to automatically detect issues in the computing environment 102, perform actions on one or more CIs based on user selection and generate logs among other things. Examples of the IT management subsystem 104 include, but are not limited to Holmes and Ignio AI driven tools.

Figure 1A:
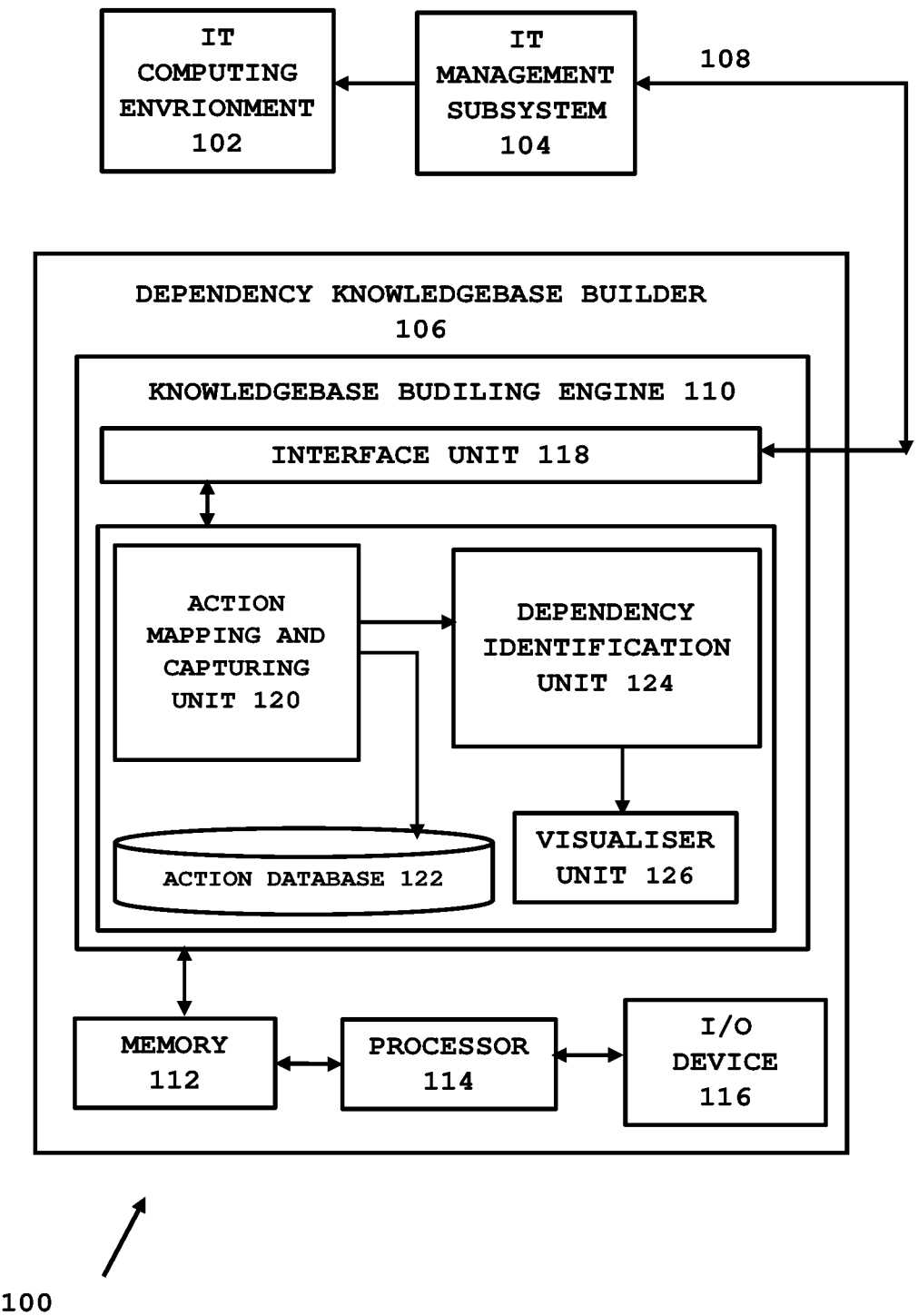
FIG. 1A illustrates a detailed block diagram of a system for building a knowledgebase of dependencies between Configuration Items(CIs) associated with a computing environment, in accordance with various embodiments of the present invention.

In accordance with various embodiments of the present invention, the dependency knowledgebase builder 106 is a software executable by any computing device or a combination of software and hardware. In an embodiment of the present invention as shown in FIG. 1 and FIG. 1A, the dependency knowledgebase builder 106 is a combination of software and hardware. In an embodiment of the present invention, the dependency knowledgebase builder 106 may be implemented using a client-server architecture, wherein the IT management subs-system 104 or any other computing device (not shown) accesses a server hosting the dependency knowledgebase builder 106 via a communication channel 108. In another embodiment of the present invention, the dependency knowledgebase builder 106 may be implemented in a cloud computing architecture in which data, applications, services, and other resources are stored and delivered through shared data-centers. In an exemplary embodiment of the present invention, the functionalities of the dependency knowledgebase builder 106 are delivered as Software as a Service (SAAS) to one or more client-computing devices. In an exemplary embodiment of the present invention, the dependency knowledgebase builder 106 is a remote resource implemented over the cloud and accessible for shared usage in a distributed computing architecture by the IT management subsystem 104 and/or multiple client-computing devices. In an exemplary embodiment of the present invention, the dependency knowledgebase builder 106 may be accessed via an IP address/domain name. In another exemplary embodiment of the present invention, the dependency knowledgebase builder 106 may be accessed via a user module of the dependency knowledgebase builder 106 executable on a client-computing device (not shown).

In another embodiment of the present invention, the dependency knowledgebase builder 106 is a software integrated with the IT management subsystem 104. In an embodiment of the present invention, the IT management subsystem 104 is configured with a Graphical User Interface (GUI) of the dependency knowledgebase builder 106 to at least provide a list of configuration items(components) of the IT computing environment 102, perform actions on the configuration items, and receive graphical representation of dependencies between CIs.

In accordance with various embodiments of the present invention, the dependency knowledgebase builder 106 is configured to interface with the IT management subsystem 104 and/or the IT computing environment 102. In an embodiment of the present invention as shown in FIG. 1, the dependency knowledgebase builder 106 is configured to interface with the IT management subsystem 104 over a communication channel 108. In an embodiment of the present invention, the dependency knowledgebase builder 106 is configured to directly interface with the IT computing environment 102 over the communication channel 108. Examples of the communication channel 108 may include, but are not limited to, an interface such as a software interface, a physical transmission medium such as a wire, or a logical connection over a multiplexed medium such as a radio channel in telecommunications and computer networking. Examples of radio channel in telecommunications and computer networking may include, but are not limited to, a Local Area Network (LAN), a Metropolitan Area Network (MAN), and a Wide Area Network (WAN). In an embodiment of the present invention, the dependency knowledgebase builder 106 is configured to interface with the IT management subsystem 104 to retrieve a list of configuration items in the IT computing environment and associate actions with the respective configuration items. In another embodiment of the present invention, the dependency knowledgebase builder 106 is configured to interface with a client-computing device(not shown) and/or any external resource (not shown) such as a storage to receive the list of configuration items(CIs) in the IT computing environment 102. Further, the dependency knowledgebase builder 106 is configured to interface with the IT computing environment 102 to associate actions with the respective configuration items.

Referring to FIG. 1A a detailed block diagram of a system for building a knowledgebase of dependencies between Configuration Items(CIs) associated with a computing environment is illustrated. In an embodiment of the present invention, the dependency knowledgebase builder 106 comprises a knowledgebase building engine 110, a memory 112, a processor 114, and an Input/output (I/O) device 116. The knowledgebase building engine 110 is operated via the processor 114 specifically programmed to execute instructions stored in the memory 112 for executing functionalities of the knowledgebase building engine 110. In accordance with various embodiments of the present invention, the memory 112 may be a Random Access Memory (RAM), a Read-only memory (ROM), a hard drive disk (HDD) or any other memory capable of storing data and instructions.

In accordance with various embodiments of the present invention, the knowledgebase building engine 110 is a self-learning dynamic engine configured to map configuration items with actions, identify complex dependencies between CIs based on performed actions, build a knowledgebase based on identified dependencies and generate graphical representations of the identified dependencies.

In accordance with various embodiments of the present invention, the knowledgebase building engine 110 comprises an interface unit 118, an action mapping and capturing unit 120, an action database 122, a dependency identification unit 124, and a visualizer unit 126. The various units of the knowledgebase building engine 110 are operated via the processor 114 specifically programmed to execute instructions stored in the memory 112 for executing respective functionalities of the multiple units (118 120, 122, 124 and 126) in accordance with various embodiments of the present invention.

In accordance with various embodiments of the present invention, the interface unit 118 is configured to facilitate communication with the IT management subsystem 104, the IT computing environment 102, client-computing device (not shown), and any other external resource (not shown). Examples of external resource may include, but are not limited to, storage devices, and third party systems such as computing resources, databases etc. In an embodiment of the present invention, the interface unit 118 is configured to facilitate communication with the I/O device 116 associated with the dependency knowledgebase builder 106 for updating system configurations, receiving inputs or performing actions and displaying results.

In an embodiment of the present invention, the interface unit 118 comprises any of the following: a web gateway, a mobile gateway, a Graphical User Interface(GUI), an integration interface, a configuration interface or combinations thereof to facilitate interfacing with the IT management subsystem 104, the IT computing environment 102, the client-computing device (not shown), the I/O device 116 and other external resource (not shown). In an exemplary embodiment of the present invention, the integration interface is configured with one or more APIs, such as REST and SOAP APIs to facilitate smooth interfacing and/or integration with the IT management subsystem 104, and/or any client-computing device (not shown). In an embodiment of the present invention, the configuration interface provides communication with the Input/output device 116 for receiving, updating and modifying administration configurations from system admins, and receiving other data.

In an embodiment of the present invention, the GUI is accessible on the I/O device 116 to facilitate user interaction. In another embodiment of the present invention, the GUI is accessible on the client-computing device and/or the IT management subsystem 104 to facilitate user interaction. In an exemplary embodiment of the present invention, the Graphical User Interface(GUI) allows a user to at least: create login credentials, sign-in using the login credentials, map actions with CIs of the IT computing environment 102, select and perform actions on the configuration items, and receive graphical representations of dependencies between CIs amongst other things. In an embodiment of the present invention, the graphical user interface (GUI) may be accessed from a client-computing device through web-browser via the web gateway. In another embodiment of the present invention, the GUI may be accessed by the mobile gateway using a user module installable on any client-computing device. In an embodiment of the invention, where the dependency knowledgebase builder 106 is a software capable of being integrated with the IT management subsystem 104, the GUI along with other units are locally accessible on IT management subsystem 104 via the configuration interface of the interface unit 118.

In accordance with various embodiments of the present invention, the action mapping and capturing unit 120 is configured to map each of the Configuration Items(CIs) out of the plurality of CIs of the computing environment 102 with one or more actions. In an embodiment of the present invention, each activity associated with any CI is representative of any issue or any task related to the CIs. In an embodiment of the present invention, each action is representative of a series of steps to be performed on corresponding CI of the computing environment 102 in order to execute a task activity or resolve an issue activity related to a reported CI. In accordance with various embodiments of the present invention, the actions may be predefined or user-defined. In an embodiment of the present invention, the user-defined actions may be created for one or more configuration Item of the IT commuting environment by a service engineer. Examples of task activity may include, but are not limited to, hosting of an application on a server in the computing environment 102, configuring of workstations with printer access in the computing environment 102 etc. Examples of issue activity may include, but are not limited to, an application not working, server not working, printer not accessible etc. In operation, the action mapping and capturing unit 120 is configured to retrieve a list of CIs associated with the computing environment 102. In an embodiment of the present invention, the list of CIs is retrieved from the IT management subsystem 104 and/or a database (not shown). Further, each CI associated with the computing environment 102 is mapped with corresponding action. In an embodiment of the present invention, the actions are retrieved from the action database 122. In an embodiment of the present invention, each CI is mapped with respective one or more actions based on inputs from a service engineer. In another embodiment of the present invention, each CI is mapped with one or more actions based on a predefined mapping table maintained in the action database 122, where the mapping table comprises CIs mapped with the respective one or more actions based on the inherent architectural technology of the CI.

In accordance with various embodiments of the present invention, the action mapping and capturing unit 120 is configured to perform one or more mapped actions on one or more CIs and/or the reported CI to execute a task activity or troubleshoot an issue activity related to a reported CI. In operation, a user may generate an activity ticket via the IT management subsystem 104. In an embodiment of the present invention, the activity ticket comprises a Configuration Item (CI), a task activity or an issue activity associated with the CI, and/or a site of the configuration item. In an embodiment of the present invention, the site of the configuration item is extracted from onboarding data of the reported Configuration Item. In an embodiment of the present invention, the onboarding data is collected by the IT management subsystem 104 during the setup of the computing environment 102. In another embodiment of the present invention, the onboarding data is manually maintained in a database(not shown) by a service engineer during the setup of the IT computing environment 102. Subsequently, the action mapping and capturing unit 120 is configured to perform one or more actions on one or more CIs and/or the reported CI to execute a task activity or troubleshoot an issue activity related to the reported CI on receiving the activity ticket. In an embodiment of the present invention, the one or more actions are performed directly by the action mapping and capturing unit 120 based on inputs of a service engineer received via a client computing device (not shown) or I/O device 116. In another embodiment of the present invention, the one or more actions are performed via the IT management subsystem 104 based on inputs of a service engineer. In operation, when an activity ticket associated with reported CI is received, the service engineer based on its technical expertise identifies the one or more actions to be performed on one or more CIs and/or the reported CI in the computing environment 102 to execute a task activity or troubleshoot an issue activity related to the reported CI. Thereafter, the identified one or more actions are performed on the reported CI itself and/or the one or more CIs that are anticipated by the service engineer to be a cause of issue activity or are required in execution of task on the reported CI itself. In an exemplary embodiment of the present invention, the identified one or more actions may be diagnostic or issue resolving in nature. For example, where a task activity is hosting of an application on a server in the computing environment 102, the service engineer may identify one or more actions to be performed on the application, the server and other components of the computing environment 102 to host the application. In another example where the issue activity is "application not working", then the service engineer identifies the one or more actions based on its technical expertise which are to be performed on the application and/or the one or more CIs that are anticipated by the service engineer to be a cause of application not working in order to resolve the issue.

In accordance with various embodiments of the present invention, the action mapping and capturing unit 120 is configured to track and capture in real-time the one or more actions performed on the one or more CIs and/or the reported CI to execute the task activity or troubleshoot the issue activity related to the reported CI. In accordance with various embodiments of the present invention, the tracked actions are stored in a database(not shown). In an embodiment of the present invention, the tracking and capturing of the one or more actions performed on a reported CI and/or one or more CIs in the computing environment 102 is automatically invoked on receiving an activity ticket from a user of the computing environment 102. In an embodiment of the present invention, every activity ticket is indicative of an issue activity or a task activity associated with any CI of the computing environment 102. In an embodiment of the present invention, the one or more actions performed on one or more CIs and/or the reported CI to execute a task activity or troubleshoot an issue activity related to the reported CI are tracked and captured until the task execution is complete or issue activity is resolved. In an embodiment of the present invention, the tracking and capturing of the one or more actions is revoked on closure of the activity ticket, in particular after completion of a task activity or resolution of an issue activity. In an embodiment of the present invention, the activity ticket is closed by the service engineer. In an embodiment of the present invention, the action mapping and capturing unit 120 is configured to track and capture in real-time one or more actions performed on one or more CIs and/or the reported CI to execute a task activity or troubleshoot an issue activity related to a reported CI for every distinct activity. In an embodiment of the present invention, the incoming activity tickets associated with same CI but having a different issue are linked with the prior ticket. In an embodiment of the present invention, the incoming activity tickets associated with same CI for the same issue are queued.

In accordance with various embodiments of the present invention, the dependency identification unit 124 is configured to receive the captured one or more actions performed on one or more CIs and/or the reported CI to execute a task activity or troubleshoot an issue activity related to the reported CI from the action mapping and capturing unit 120. In accordance with various embodiments of the present invention, the dependency identification unit 124 is configured to dynamically identify dependencies or relationships between one or more CIs and the reported CI based on the captured one or more actions performed on the one or more CIs and/or the reported CI. In an embodiment of the present invention, the dependency identification unit 124 is configured to identify dependencies based on the captured one or more actions using data analysis. In an embodiment of the present invention, the dependency identification unit 124 is configured to receive the captured one or more actions performed on one or more CIs and/or the reported CI for every activity ticket. Further, the dependency identification unit 124 is configured to identify relationships between the one or more CIs and the reported CI for every activity ticket.

In operation, identification of dependencies between one more CIs comprises marking the CI to which the issue activity or task activity was tagged at the time of resolution of the issue or completion of requested task as the primary CI. The identification of dependencies further comprises determining the one or more actions that were performed on the one or more CIs of the computing environment 102 other than the primary CI using data analysis on the captured one or more actions. Identifying the one or more CIs of the computing environment 102 on which the determined one or more actions were performed to execute a task or resolve an issue using data analysis on the determined one or more actions. Rejecting the primary CI and the one or more CIs based on identification of a predefined type of CI. Examples of predefined type of CI may include, but are not limited to mailbox, Information Technology Service Management (ITSM) and monitoring. In an exemplary embodiment of the present invention, the predefined type of CI is identified based on the onboarding data of the respective CIs. As already described above, the onboarding data is collected by the IT management subsystem 104 during the setup of the computing environment 102. In another embodiment of the present invention, the onboarding data is manually maintained in a database(not shown) by a service engineer during the setup of the IT computing environment 102. In accordance with various embodiments of the present invention, the onboarding data associated with any CI comprises information, including, but not limited to the type, subtype and the technology of the CI. For example, onboarding data associated with the CI server, includes CI type as server, CI sub-type as Operating System, and CI technology as Windows/Linux. Further, the identification of dependencies comprises marking the identified one or more CIs excluding the rejected predefined type of CI as the dependent CIs.

In an embodiment of the present invention, the dependency identification unit 124 is configured to form a dependency topology based on the identified dependencies between the one or more CIs and the reported CI. In an embodiment of the present invention, the dependency identification unit 124 is configured to form dependency topology between the primary CI and the identified one or more dependent CIs. In an embodiment of the present invention, forming dependency topology based on the identified dependencies comprises performing a check to validate if the primary CI and the dependent CIs associated with the identified dependencies are valid working components of the IT computing environment 102, determining if the type of primary CI to which the reported activity is tagged is a software application CI or a hardware site CI, and selecting a relation such as primary CI "depends on" or primary CI "impacted by" based on the determined type, where "depends on" is selected if the primary CI is software application and "impacted by" is selected if the primary CI is a hardware site. Examples of hardware site may include, but are not limited to, a physical entity, such as a data center. In an embodiment of the present invention, a check to validate if the primary CI and the dependent CIs associated with the identified dependencies are valid working components of the IT computing environment 102 is performed based on the off-boarding information of the IT computing environment 102. In an embodiment of the present invention, the off-boarding information is collected by the IT management subsystem 104 during decommissioning of the CI from the computing environment 102. In another embodiment of the present invention, the off-boarding information is manually maintained in a database (not shown) by a service engineer during decommissioning of the CI from the IT computing environment 102. For example, during performance of one or more actions on the one or more CIs of the computing environment 102, a CI may have been decommissioned due to a fault, or for some reason the CI may no longer be a valid component in the IT computing environment 102, thereafter the inactive status of the CI is stored as off-boarding information by a service engineer in a database(not shown).

In an example, where a task activity is hosting an application on a server in the computing environment 102, the "application" is marked as the primary CI and the server and other components of the server or of the computing environment 102 that enable the hosting of application are marked as dependent CIs, and dependency topology, such as application depends on server(CI) or other CIs is created. In another example, where a task activity may be configuring of workstations with printer access in the computing environment 102, the printer is marked as the primary CI and other components, such as router or any other network device or software configuration that enable printer access are marked as dependent CIs, and a dependency topology, such as printer depends on CI(router) is created. In another example where the issue activity is application not working, then the application on which the issue is reported is marked as the primary CI, and the site or server where the application is hosted along with other components on which one or more actions were performed to resolve the issue are marked as the dependent CIs, and a dependency topology, such as application depends on CI(server) is created. In the same example if the non-working of application was due to an impacted server, then another dependency topology, such as server impacted by CI is created between the server as the primary CI and the dependent CI impacting the server.

In accordance with various embodiments of the present invention, the dependency identification unit 124 is further configured to build a knowledgebase of dependencies between CIs in the computing environment based on the formed dependency topologies between the one or more CIs and the reported CI.

In accordance with various embodiments of the present invention, the visualizer unit 126 is configured to generate visual representations of dependencies between CIs of the computing environment 102 based on the knowledgebase. In an embodiment of the present invention, the visual representations are configured to illustrate a CI and one or more CIs dependent on the CI using graphical visuals. In an exemplary embodiment of the present invention, the dependent CIs are represented as arrow lines arising from the primary CI. Further, the relation such as "depends on" or "impacted by" are labeled along the length of arrow lines.

In accordance with various embodiments of the present invention, the visualizer unit 126 is configured to visually represent issues in the computing environment 102 by using the visual representations of dependencies between the CIs. In an embodiment of the present invention, the visualizer unit 126 is configured to represent issues in the computing environment 102 by highlighting the dependent CIs in the visual representations using red or amber color. In an exemplary embodiment of the present invention, the color coded dependent CIs further have a blink animation indicative of an issue with the CI.

Advantageously, the system of the present invention, affords a technical effect in the realm of information and technology by facilitating efficient detection and resolution of issues in the IT computing environment by means of a knowledgebase of dependencies between various Configuration Items(components) of the IT computing environment. Further, the system of the present invention affords a technical effect by enabling dynamic identification of relationships between various configuration items of the IT computing environment based on actions performed during troubleshooting. Yet further, the system of the present invention affords reduced turnaround time and precise resolution of a CI related issue in the IT computing environment, thereby, enhancing the operational metrics of the IT computing environment. Yet further, the system of the present invention provides ease of integration with any existing IT computing environment, thereby facilitating improvement of any existing IT computing environment.

Figure 2:
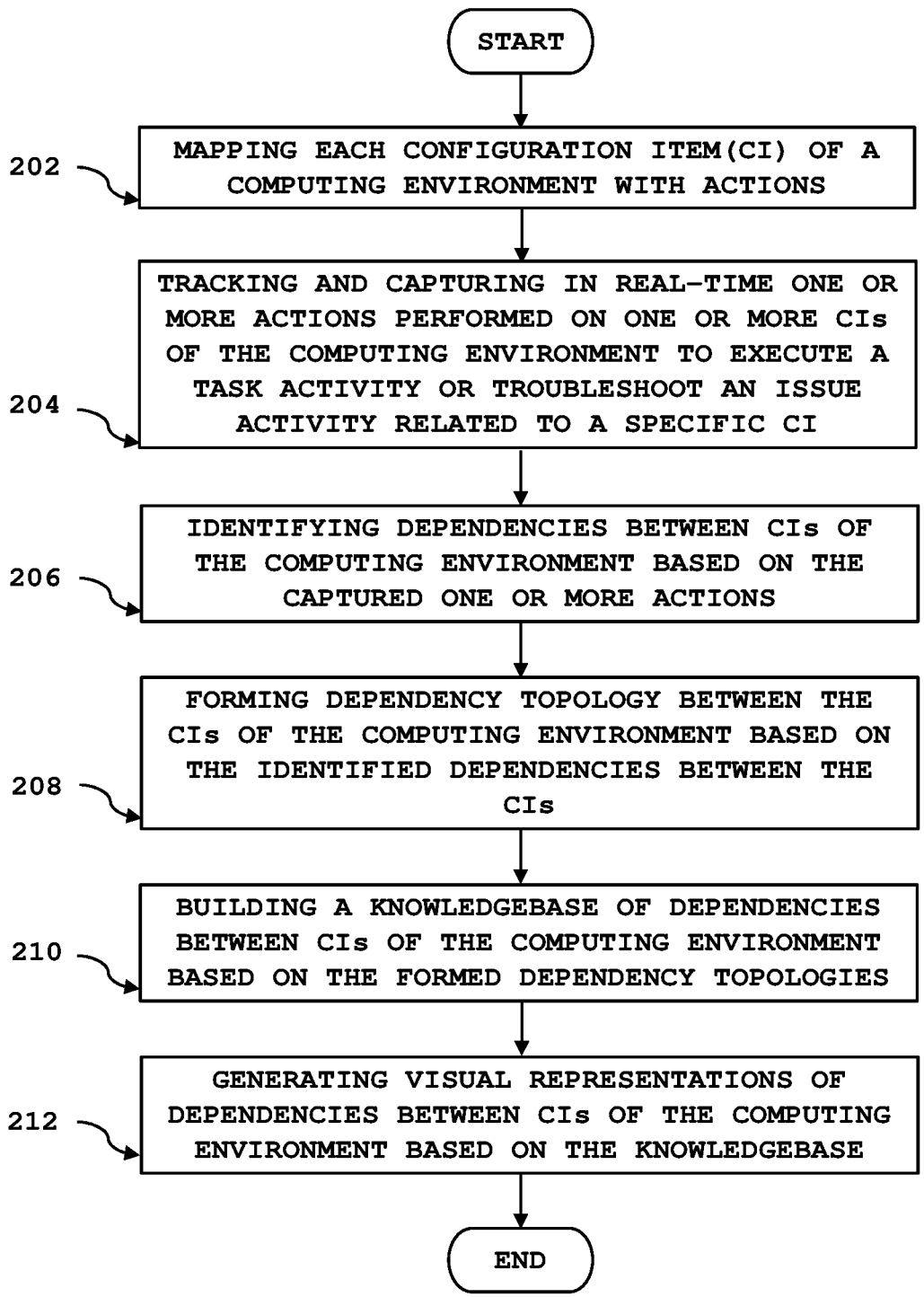
FIG. 2 is a flowchart illustrating a method for building a knowledgebase of dependencies between Configuration Items(CIs) associated with a computing environment, in accordance with various embodiments of the present invention.

Referring to FIG. 2, a flowchart of a method for building a knowledgebase of dependencies between Configuration Items(CIs) associated with a computing environment is shown, in accordance with various embodiments of the present invention.

At step 202, each Configuration Item(CI) of a computing environment is mapped with actions. In an embodiment of the present invention, each of the plurality of CIs of the IT computing environment (102 of FIG. 1) is mapped with respective one or more actions. In an embodiment of the present invention, each activity associated with any CI is representative of any issue or any task related to the CIs. In embodiment of the present invention, each action is representative of a series of steps to be performed on corresponding CI of the computing environment (102) in order to execute a task activity or resolve an issue activity related to a reported CI out of the plurality of CIs. In accordance with various embodiments of the present invention, the actions may be predefined or user-defined. In an embodiment of the present invention, the user-defined actions may be created for one or more CIs of the IT commuting environment by a service engineer. Examples of task activity may include, but are not limited to, hosting of an application on a server in the computing environment 102, configuring of workstations with printer access in the computing environment 102 etc. Examples of issue activity may include, but are not limited to, an application not working, server not working, printer not accessible etc. In operation, a list of CIs associated with the IT computing environment 102 is retrieved. In an embodiment of the present invention, the list of CIs is retrieved from an IT management subsystem (104 of FIG. 1) and/or a database (not shown). Further, each CI associated with the computing environment 102 is mapped with corresponding action. In an embodiment of the present invention, the actions are retrieved from an action database (122 of FIG. 1). In an embodiment of the present invention, each CI is mapped with respective one or more actions based on user-inputs from a service engineer. In another embodiment of the present invention, each CI is mapped with respective one or more actions based on a predefined mapping table maintained in the action database, where the mapping table comprises CIs mapped with the respective one or more actions based on the inherent architectural technology of the CI.

At step 204, one or more actions out of the mapped actions performed on one or more CIs of the computing environment to execute a task activity or troubleshoot an issue activity related to a reported CI are tracked and captured in real-time. In particular, the one or more actions performed on one or more CIs and/or a reported CI to execute a task activity or troubleshoot an issue activity related to the reported CI are tracked and captured in real-time. In accordance with various embodiments of the present invention, the tracked actions are stored in a database (not shown). In an embodiment of the present invention, the tracking and capturing of the one or more actions on a reported CI and/or one or more CIs in the computing environment is automatically invoked on receiving an activity ticket from a user of the computing environment. In an embodiment of the present invention, every activity ticket is indicative of an issue activity or a task activity associated with any CI of the computing environment 102. In an embodiment of the present invention, the tracking and capturing of the one or more actions is revoked on closure of the activity ticket, in particular after completion of a task activity or resolution of an issue activity. In an embodiment of the present invention, one or more actions performed on one or more CIs and/or the reported CI to execute a task activity or troubleshoot an issue activity related to a reported CI are tracked and captured for every distinct activity. In an embodiment of the present invention, the activity tickets associated with same CI but having a different issue are linked with the prior ticket. In an embodiment of the present invention, the incoming activity tickets associated with same CI for the same issue are queued.

In operation, a user may generate an activity ticket via the IT management subsystem (104 of FIG. 1). In an embodiment of the present invention, the activity ticket comprises a Configuration Item (CI), a task activity or an issue activity associated with the CI, and/or a site of the configuration item. In an embodiment of the present invention, the site of the configuration item is extracted from onboarding data of the reported Configuration Item. In an embodiment of the present invention, the onboarding data is collected by the IT management subsystem during the setup of the computing environment. In another embodiment of the present invention, the onboarding data is manually maintained in a database (not shown) by a service engineer during the setup of the IT computing environment. Subsequently, one or more actions out of the mapped actions are performed on one or more CIs and/or the reported CI to execute a task activity or troubleshoot an issue activity related to the reported CI on receiving the activity ticket. In an embodiment of the present invention, the one or more actions are performed based on selection by a service engineer. In an embodiment of the present invention, the one or more actions are performed via the IT management subsystem based on inputs of a service engineer. In operation, when an activity ticket associated with reported CI is received, the service engineer based on its technical expertise identifies the one or more actions to be performed on one or more CIs and/or the reported CI in the computing environment to execute a task activity or troubleshoot an issue activity related to the reported CI. Thereafter, the identified one or more actions are performed on the reported CI itself and/or the one or more CIs that are anticipated by the service engineer to be a cause of issue activity or are required in execution of task on the reported CI itself. In an exemplary embodiment of the present invention, the identified one or more actions may be diagnostic or issue resolving in nature. For example, where a task activity is hosting of an application on a server in the computing environment 102, the service engineer may identify one or more actions to be performed on the application, the server and other components of the computing environment to host the application. In another example where the issue activity is application not working, then the service engineer identifies the one or more actions based on its technical expertise which are to be performed on the application and/or the one or more CIs that are anticipated by the service engineer to be a cause of application not working in order to resolve the issue. Further, the one or more actions performed on one or more CIs and/or the reported CI to execute a task activity or troubleshoot an issue activity related to the reported CI are captured until the task execution is complete or issue activity is resolved. In an embodiment of the present invention, the tracking and capturing of one or more actions performed on one or more CIs is revoked when the activity ticket is closed by the service engineer.

At step 206, dependencies or relationships between CIs of the computing environment are dynamically identified based on the captured one or more actions. In accordance with various embodiments of the present invention, dependencies or relationships between one or more CIs and the reported CI are dynamically identified based on the captured one or more actions performed on the one or more CIs and/or the reported CI. In an embodiment of the present invention, dependencies are identified based on the captured one or more actions using data analysis. In an embodiment of the present invention, the captured one or more actions performed on one or more CIs and/or the reported CI are received for every distinct activity ticket. Further, the dependencies between the one or more CIs and the reported CI are identified for every activity ticket.

In operation, identification of dependencies between one more CIs comprises marking the CI to which the issue activity or task activity was tagged at the time of resolution of the issue or completion of requested task as the primary CI. The identification of dependencies further comprises determining the one or more actions that were performed on the one or more CIs of the computing environment other than the primary CI using data analysis on the captured one or more actions. Identifying the one or more CIs of the computing environment on which the determined one or more actions were performed to execute a task or resolve an issue using data analysis on the determined one or more actions. Rejecting the primary CI and the identified one or more CIs based on an identification of a predefined type of CI. Examples of predefined type of CI may include, but are not limited to mailbox, Information Technology Service Management(ITSM) and monitoring. In an exemplary embodiment of the present invention, the predefined type of CI is identified based on the onboarding data of the respective CIs. As already described above, the onboarding data is collected during the setup of the computing environment 102 by the IT management subsystem. In another embodiment of the present invention, the onboarding data is manually maintained in a database (not shown) by a service engineer during the setup of the IT computing environment 102. In accordance with various embodiments of the present invention, the onboarding data associated with any CI comprises information, including, but not limited to the type, subtype and the technology of the CI. For example, onboarding data associated with the CI server, includes CI type as server, CI sub-type as Operating System, and CI technology as Windows/Linux. Further, the identification of dependencies comprises marking the identified one or more CIs excluding the rejected predefined type of CI as the dependent CIs.

At step 208, dependency topology between the CIs of the computing environment are formed based on the identified dependencies between the CIs. In an embodiment of the present invention, a dependency topology is formed for each of identified dependencies between each reported CI and respective one or more CIs. In an embodiment of the present invention, the dependency topology between the primary CI and the identified one or more dependent CIs is formed. In an embodiment of the present invention, forming dependency topology based on the identified dependencies comprises performing a check to validate if the primary CI and the dependent CIs associated with the identified dependencies are valid working components of the IT computing environment; determining if the type of primary CI to which the reported activity is tagged is a software application CI or a hardware site CI, and selecting a relation such as primary CI "depends on" or primary CI "impacted by" based on the determined type, where "depends on" is selected if the primary CI is a software application and "impacted by" is selected if the primary CI is a hardware site. Examples of hardware site may include, but are not limited to, a physical entity, such as a data center. In an embodiment of the present invention, a check to validate if the primary CI and the dependent CIs associated with the identified dependencies are valid working components of the IT computing environment is performed based on the off-boarding information of the IT computing environment 102. In an embodiment of the present invention, the off-boarding information is collected by the IT management subsystem 104 during decommissioning of the CI from the computing environment 102. In another embodiment of the present invention, the off-boarding information is manually maintained in a database (not shown) by a service engineer during decommissioning of the CI from the IT computing environment. For example, during performance of one or more actions on the one or more CIs of the computing environment, a CI may have been decommissioned due to a fault, or for some reason the CI may no longer be a valid component in the IT computing environment 102, thereafter the inactive status of the CI is stored as off-boarding information by a service engineer in a database(not shown).

In an example, where a task activity is hosting an application on a server in the computing environment, the "application" is marked as the primary CI and the server and other components of the server or of the computing environment that enable the hosting of application are marked as dependent CIs, and dependency topology, such as application depends on/hosted on server(CI) or other CIs is created. In another example, where a task activity may be configuring of workstations with printer access in the computing environment 102, the printer is marked as the primary CI and other components, such as router or any other network device or software configuration that enable printer access are marked as dependent CIs, and a dependency topology, such as printer depends on CI(router) is created. In another example where the issue activity is application not working, then the application on which the issue is reported is marked as the primary CI, and the site or server where the application is hosted along with other components on which one or more actions were performed to resolve the issue are marked as the dependent CIs, and a dependency topology, such as application depends on CI(server) is created. In the same example if the non-working of application was due to an impacted server, then another dependency topology, such as server impacted by CI is created between the server as the primary CI and the dependent CI impacting the server.

At step 210, a knowledgebase of dependencies between CIs of the computing environment is built based on the formed dependency topologies between the CIs of the computing environment. In an embodiment of the present invention, a knowledgebase of dependencies between CIs of the computing environment is built based on each of the formed dependency topologies between the one or more CIs and the reported CI.

At step 212, visual representations of dependencies between CIs of the computing environment is generated based on the knowledgebase. In accordance with various embodiments of the present invention, visual representations of dependencies between various CIs of the computing environment is generated based on the knowledgebase. In an embodiment of the present invention, the visual representations are configured to illustrate a CI and one or more CIs dependent on the CI using graphical visuals. In an exemplary embodiment of the present invention, the dependent CIs are represented as arrow lines arising from the primary CI. Further, the relation such as "depends on" or "impacted by" are labeled along the length of arrow lines.

In accordance with various embodiments of the present invention, issues in the computing environment are represented by using the visual representations of dependencies between the CIs. In an embodiment of the present invention, issues in the computing environment are represented by highlighting the dependent CIs in the visual representations using red or amber color. In an exemplary embodiment of the present invention, the color coded dependent CIs further have a blink animation indicative of an issue with the CI.

Advantageously, the method of the present invention, affords a technical effect in the realm of information and technology by facilitating efficient detection and resolution of issues in the IT computing environment by means of a knowledgebase of dependencies between various Configuration Items(components) of the IT computing environment. Further, the method of the present invention affords a technical effect by enabling dynamic identification of relationships between various configuration items of the IT computing environment based on performance of mapped actions. Yet further, the method of the present invention affords reduced turnaround time and precise resolution of a CI related issue in the IT computing environment, thereby, enhancing the operational metrics of the IT computing environment. Yet further, the method of the present invention provides ease of implementation on any existing IT computing environment, thereby facilitating improvement of any existing IT computing environment.

Figure 3:
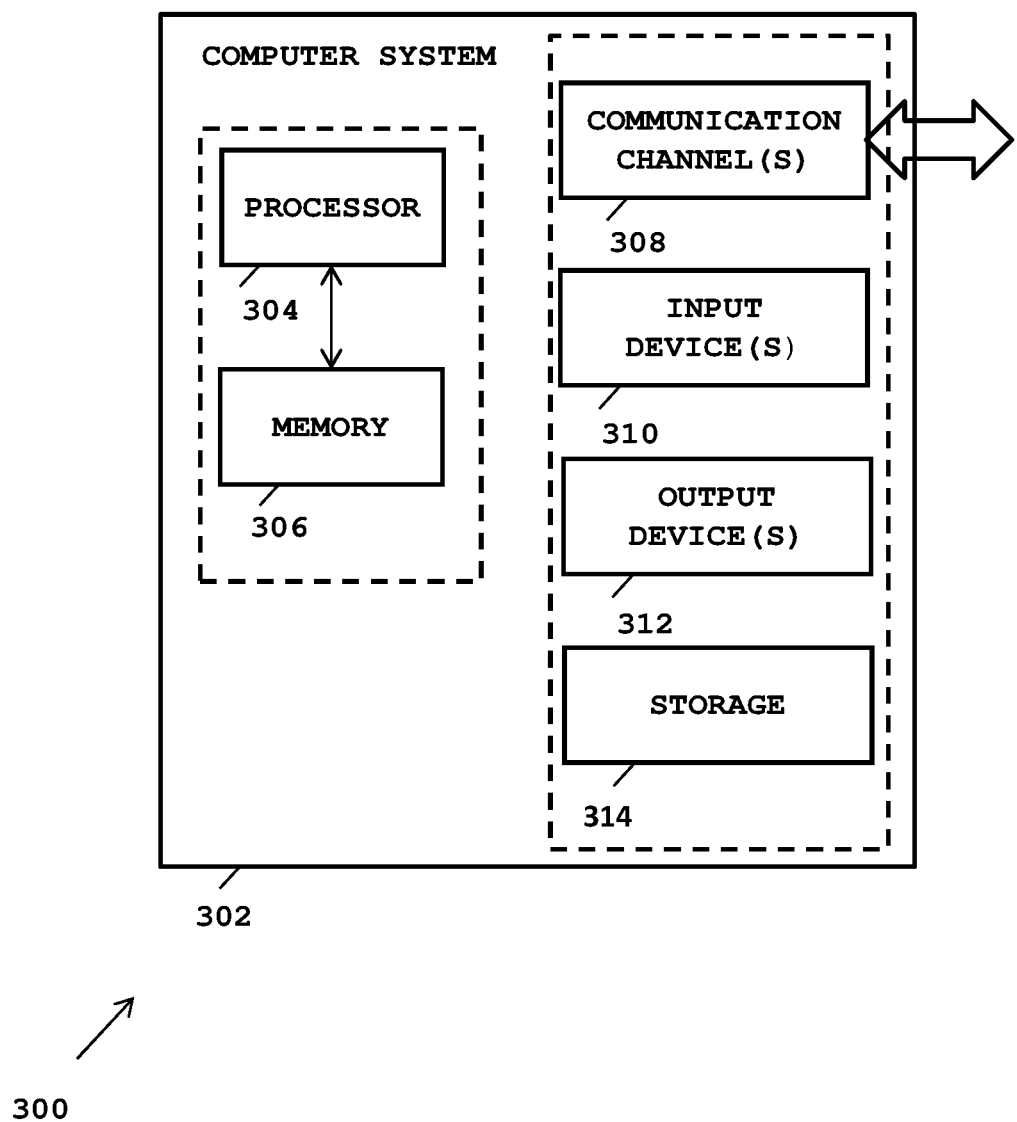
FIG. 3 illustrates an exemplary computer system in which various embodiments of the present invention may be implemented.

FIG. 3 illustrates an exemplary computer system in which various embodiments of the present invention may be implemented.

The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various softwares executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A method for building a knowledgebase of dependencies between a plurality of Configuration Items (CIs) of an IT computing environment, wherein the method is implemented by a processor executing program instructions stored in a memory, the method comprising:
   a. mapping, by the processor, each of the plurality of Configuration Items (CIs) of the IT computing environment with respective one or more actions;
   b. tracking and capturing, by the processor, one or more actions out of the mapped actions performed on one or more CIs and/or a reported CI out of the plurality of CIs in relation to resolving an activity associated with the reported CI;
   c. identifying, by the processor, dependency between the reported CI and the one or more CIs based on the captured one or more actions using data analysis, wherein the identification comprises:
      marking a CI from the reported CI or the one or more CIs out of the plurality of CIs to which the activity is tagged at a time of resolution of the activity as a primary CI;
      determining one or more actions performed on the one or more CIs other than the primary CI using data analysis on the captured one or more actions;
      identifying the one or more CIs of the computing environment on which the determined one or more actions are performed in relation to resolving the activity using data analysis on the determined one or more actions;
      rejecting the primary CI and the identified one or more CIs based on an identification of a predefined type of CI selected from a group comprising mailbox, Information Technology Service Management (ITSM) and monitoring type; and
      marking the identified one or more CIs excluding the rejected predefined type of CI as dependent CIs of the primary CI;
   d. forming, by the processor, dependency topology between the reported CI and the one or more CIs based on the identified dependency between said reported CI and said one or more CIs;
   e. repeating, by the processor, steps b, c and d for every distinct activity associated with each reported CI out of the plurality of CIs; and
   f. building, by the processor, the knowledgebase of dependencies between the plurality of CIs based on each of the formed dependency topologies between each of the reported CIs and the one or more CIs, thereby enabling dynamic identification of relationships between various CIs of the IT computing environment based on performance of mapped actions.

2. The method as claimed in claim 1, wherein the respective one or more actions are predefined, user defined or a combination of predefined and user-defined, and each action is representative of a series of steps to be performed on a corresponding CI of the IT computing environment in relation to one or more activities associated with any reported CI out of the plurality of CIs.

3. The method as claimed in claim 1, wherein mapping each of the plurality of Configuration Items(CIs) with the respective one or more actions comprises:
   retrieving a list of the plurality CIs of the IT computing environment; and mapping each of the plurality of CIs with the respective one or more actions based on user-inputs or a predefined mapping table comprising each of the plurality of CIs mapped with the respective one or more actions based on the inherent architectural technology of the CIs.

4. The method as claimed in claim 1, wherein every activity is representative of a task or an issue associated with any CI out of the plurality of CIs.

5. The method as claimed in claim 1, wherein the one or more actions out of the mapped actions performed on one or more CIs and/or the reported CI are selected based on user-inputs.

6. The method as claimed in claim 1, wherein the one or more actions out of the mapped actions are performed on the one or more CIs and/or the reported CI via an IT management subsystem based on user-inputs.

7. The method as claimed in claim 1, wherein each of the respective one or more actions are diagnostic or issue resolving in nature.

8. The method as claimed in claim 1, wherein the tracking and capturing of the one or more actions out of the mapped actions performed on the one or more CIs and/or the reported CI is automatically invoked on receiving an activity ticket indicative of the activity; and the tracking and capturing of the one or more actions is automatically revoked on closure of said activity ticket.

9. The method as claimed in claim 1, wherein the one or more actions out of the mapped actions performed on the one or more CIs and/or the reported CI out of the plurality of CIs in relation to resolving the activity associated with the reported CI are tracked and captured in real-time until the activity is resolved.

10. The method as claimed in claim 1, wherein the predefined type of CI is identified based on an onboarding data of respective CIs, said onboarding data comprising a type, a subtype and technology of respective CIs.

11. The method as claimed in claim 1, wherein forming the dependency topology between the reported CI and the one or more CIs based on the identified dependency between said reported CI and said one or more CIs comprises:
   performing a check to validate if the primary CI and the dependent CIs are valid working components of the IT computing environment based on an off-boarding information of the IT computing environment;
   determining if a type of primary CI is a software application CI or a hardware site CI; and
   selecting a relation including primary CI "depends on" or primary CI "impacted by" based on the determined type, wherein "depends on" is selected if the primary CI is a software application and "impacted by" is selected if the primary CI is a hardware site.

12. The method as claimed in claim 11, wherein the dependency topology between the primary CI and the one or more dependent CIs is illustrated using graphical visuals, wherein the dependent CIs are represented as arrow lines arising from the primary CI, and the relation "depends on" and "impacted by" are labeled along the length of arrow lines.

13. The method as claimed in claim 12, wherein issues in the IT computing environment are represented by highlighting the dependent CIs using color coding, and animating the color coded dependent CIs with a blink animation indicative of an issue with said dependent CIs.

14. A system for building a knowledgebase of dependencies between a plurality of Configuration Items (CIs) of an IT computing environment, the system comprising:

a memory storing program instructions; a processor configured to execute program instructions stored in the memory; and a knowledgebase building engine executed by the processor, and configured to:
a. map each of the plurality of Configuration Items (CIs) of the IT computing environment with respective one or more actions;
b. track and capture one or more actions out of the mapped actions performed on one or more CIs and/or a reported CI out of the plurality of CIs in relation to resolving an activity associated with the reported CI;
c. identify dependency between the reported CI and the one or more CIs based on the captured one or more actions using data analysis, wherein the identification comprises:
    marking a CI from the reported CI or the one or more CIs out of the plurality of CIs to which the activity is tagged at a time of resolution of the activity as a primary CI;
    determining one or more actions performed on the one or more CIs other than the primary CI using data analysis on the captured one or more actions;
    identifying the one or more CIs of the computing environment on which the determined one or more actions are performed in relation to resolving the activity using data analysis on the determined one or more actions;
    rejecting the primary CI and the identified one or more CIs based on an identification of a predefined type of CI selected from a group comprising mailbox, Information Technology Service Management(ITSM) and monitoring type; and
    marking the identified one or more CIs excluding the rejected predefined type of CI as dependent CIs of the primary CI;
d. form dependency topology between the reported CI and the one or more CIs based on the identified dependency between said reported CI and said one or more CIs;
e. repeat steps b, c and d for every distinct activity associated with each reported CI out of the plurality of CIs; and
f. build the knowledgebase of dependencies between the plurality of CIs based on each of the formed dependency topologies between each of the reported CIs and the one or more Cis, thereby enabling dynamic identification of relationships between various configuration items of the IT computing environment based on performance of mapped actions.

15. The system as claimed in claim 14, wherein the respective one or more actions are predefined, user defined or a combination of predefined and user-defined, and each action is representative of a series of steps to be performed on a corresponding CI of the IT computing environment in relation to one or more activities associated with any reported CI out of the plurality of CIs.

16. The system as claimed in claim 14, wherein the knowledgebase building engine comprises an action mapping and capturing unit executed by the processor, said action mapping and capturing unit configured to map each of the plurality of Configuration Items(CIs) with the respective one or more actions by:
    retrieving a list of the plurality CIs of the IT computing environment; and mapping each of the plurality of CIs with the respective one or more actions based on user-inputs or a predefined mapping table comprising each of the plurality of CIs mapped with the respective one or more actions based on the inherent architectural technology of the CIs.

17. The system as claimed in claim 14, wherein the knowledgebase building engine comprises an action mapping and capturing unit executed by the processor, said action mapping and capturing unit configured to perform the one or more actions out of the mapped actions on the one or more CIs and/or the reported CI based on user-inputs.

18. The system as claimed in claim 14, wherein every activity is representative of a task or an issue associated with any CI out of the plurality of CIs.

19. The system as claimed in claim 14, wherein the knowledgebase building engine comprises an interface unit executed by the processor, said interface unit configured to provide selection of the one or more actions out of the mapped actions performed on one or more CIs and/or the reported CI based on user-inputs.

20. The system as claimed in claim 14, wherein the tracking and capturing of the one or more actions out of the mapped actions performed on the one or more CIs and/or the reported CI is automatically invoked on receiving an activity ticket indicative of the activity; and the tracking and capturing of the one or more actions is automatically revoked on closure of said activity ticket.

21. The system as claimed in claim 14, wherein the predefined type of CI is identified based on an onboarding data of respective CIs, said onboarding data comprising a type, a subtype and technology of respective CIs.

22. The system as claimed in claim 14, wherein forming the dependency topology between the reported CI and the one or more CIs based on the identified dependency between said reported CI and said one or more CIs comprises:
    performing a check to validate if the primary CI and the dependent CIs are valid working components of the IT computing environment based on an off-boarding information of the IT computing environment;
    determining if a type of primary CI is a software application CI or a hardware site CI; and
    selecting a relation including primary CI "depends on" or primary CI "impacted by" based on the determined type, wherein "depends on" is selected if the primary CI is a software application and "impacted by" is selected if the primary CI is a hardware site.

23. The system as claimed in claim 22, wherein the knowledgebase building engine comprises a visualizer unit executed by the processor, said visualizer unit configured to illustrate the dependency topology between the primary CI and the one or more dependent CIs using graphical visuals, wherein the dependent CIs are represented as arrow lines arising from the primary CI, and the relation "depends on" and "impacted by" are labeled along the length of arrow lines.

24. The system as claimed in claim 23, wherein issues in the IT computing environment are represented by highlighting the dependent CIs using color coding, and animating the color coded dependent CIs with a blink animation indicative of an issue with said dependent CIs.

25. A computer program product comprising:
    a non-transitory computer-readable medium having computer-readable program code stored thereon, the computer-readable program code comprising instructions that, when executed by a processor, cause the processor to:
    a. map each of the plurality of Configuration Items (CIs) of the IT computing environment with respective one or more actions;

b. track and capture one or more actions out of the mapped actions performed on one or more CIs and/or a reported CI out of the plurality of CIs in relation to resolving an activity associated with the reported CI;

c. identify dependency between the reported CI and the one or more CIs based on the captured one or more actions using data analysis, wherein the identification comprises:

marking a CI from the reported CI or the one or more CIs out of the plurality of CIs to which the activity is tagged at a time of resolution of the activity as a primary CI;

determining one or more actions performed on the one or more CIs other than the primary CI using data analysis on the captured one or more actions;

identifying the one or more CIs of the computing environment on which the determined one or more actions are performed in relation to resolving the activity using data analysis on the determined one or more actions;

rejecting the primary CI and the identified one or more CIs based on an identification of a predefined type of CI selected from a group comprising mailbox, Information Technology Service Management(ITSM) and monitoring type; and marking the identified one or more CIs excluding the rejected predefined type of CI as dependent CIs of the primary CI;

d. form dependency topology between the reported CI and the one or more CIs based on the identified dependency between said reported CI and said one or more CIs;

e. repeat steps b, c and d for every distinct activity associated with each reported CI out of the plurality of CIs; and f. build the knowledgebase of dependencies between the plurality of CIs based on each of the formed dependency topologies between each of the reported CIs and the one or more Cis, thereby enabling dynamic identification of relationships between various configuration items of the IT computing environment based on performance of mapped actions.

* * * * *